United States Patent
Patton et al.

(10) Patent No.: US 10,032,025 B1
(45) Date of Patent: *Jul. 24, 2018

(54) BEHAVIOR-BASED RANSOMWARE DETECTION

(71) Applicant: Malwarebytes Inc., Santa Clara, CA (US)

(72) Inventors: Mark William Patton, San Jose, CA (US); Ares Lopez Ituiño, Malaga (ES)

(73) Assignee: Malwarebytes Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/642,093

(22) Filed: Jul. 5, 2017

Related U.S. Application Data (63) Continuation of application No. 15/414,579, filed on Jan. 24, 2017, now Pat. No. 9,734,337.

(51) Int. Cl.
*G06F 21/56* (2013.01)

(52) U.S. Cl.
CPC .......... *G06F 21/566* (2013.01); *G06F 21/568* (2013.01)

(58) Field of Classification Search
CPC ............................... G06F 21/566; G06F 21/568
See application file for complete search history.

(56) References Cited

U.S. PATENT DOCUMENTS

| | | | |
|---|---|---|---|
| 7,784,098 B1 | 8/2010 | Fan et al. | |
| 7,797,702 B1 * | 9/2010 | Ferrie | G06F 9/3851 711/202 |
| 8,220,055 B1 | 7/2012 | Kennedy | |
| 8,401,982 B1 * | 3/2013 | Satish | G06N 99/005 706/12 |
| 8,555,385 B1 * | 10/2013 | Bhatkar | G06F 21/556 726/22 |
| 8,839,435 B1 | 9/2014 | King | |
| 9,148,441 B1 | 9/2015 | Tamersoy et al. | |
| 9,294,492 B1 | 3/2016 | Martini et al. | |
| 9,361,460 B1 | 6/2016 | Satish | |
| 9,411,953 B1 | 8/2016 | Kane et al. | |

(Continued)

FOREIGN PATENT DOCUMENTS

EP 2750066 7/2014

OTHER PUBLICATIONS

Kleczynski, Marcin. "Introducing the Malwarebytes Anti-Ransomware Beta," Apr. 1, 2016, blog.malwarebytes.com/malwarebytes-news/2016/01/introducing-the-malwareby-tes-anti-ransomware-beta/.

(Continued)

*Primary Examiner* — Darren B Schwartz
(74) *Attorney, Agent, or Firm* — Fenwick & West LLP (57) ABSTRACT

An anti-malware application detects, stops, and quarantines ransomware. The anti-malware application monitors threads executing on a computing device and detects behaviors that conform to a predefined set of behaviors indicative of ransomware. Responsive to detecting these behaviors, indicators are stored to a log in a storage device. Each of the indicators in the log is associated with respective scores. A running score for each thread is generated by combining the respective scores of the indicators in the log. Responsive to determining that the running score exceeds a predefined threshold score, execution of the thread is terminated. The source ransomware file is then identified and quarantined.

18 Claims, 4 Drawing Sheets

(56) References Cited

U.S. PATENT DOCUMENTS

| | | | |
|---|---|---|---|
| 9,460,284 B1* | 10/2016 | Hajmasan | G06F 21/566 |
| 2004/0054917 A1 | 3/2004 | Obrecht et al. | |
| 2004/0098607 A1* | 5/2004 | Alagna | G06F 21/554 |
| | | | 726/24 |
| 2006/0075504 A1 | 4/2006 | Liu | |
| 2009/0070876 A1 | 3/2009 | Kim et al. | |
| 2009/0089040 A1 | 4/2009 | Monastyrsky et al. | |
| 2009/0199297 A1* | 8/2009 | Jarrett | G06F 21/566 |
| | | | 726/24 |
| 2011/0271343 A1* | 11/2011 | Kim | G06F 21/566 |
| | | | 726/23 |
| 2011/0277033 A1* | 11/2011 | Ramchetty | G06F 21/564 |
| | | | 726/24 |
| 2012/0079596 A1* | 3/2012 | Thomas | G06F 21/55 |
| | | | 726/24 |
| 2013/0024937 A1 | 1/2013 | Glew et al. | |
| 2014/0075556 A1 | 3/2014 | Wicherski | |
| 2014/0150103 A1* | 5/2014 | Kim | G06F 9/445 |
| | | | 726/23 |
| 2014/0282589 A1* | 9/2014 | Kuang | G06F 9/5016 |
| | | | 718/104 |
| 2014/0373153 A1 | 12/2014 | Niemela | |
| 2015/0013008 A1 | 1/2015 | Lukacs et al. | |
| 2015/0058987 A1 | 2/2015 | Thure et al. | |
| 2015/0058988 A1 | 2/2015 | Katz et al. | |
| 2015/0067851 A1 | 3/2015 | Cher et al. | |
| 2015/0101049 A1* | 4/2015 | Lukacs | G06F 21/566 |
| | | | 726/23 |
| 2015/0135262 A1 | 5/2015 | Porat et al. | |
| 2016/0042179 A1* | 2/2016 | Weingarten | G06F 21/566 |
| | | | 726/23 |
| 2016/0092684 A1* | 3/2016 | Langton | G06F 21/567 |
| | | | 726/23 |
| 2016/0292419 A1 | 10/2016 | Langton et al. | |
| 2016/0378988 A1 | 12/2016 | Bhashkar et al. | |
| 2017/0024561 A1* | 1/2017 | Hajmasan | G06F 21/566 |

OTHER PUBLICATIONS

"CryptoMonitor—Stop all known crypto-ransomware before it encrypts your data!", Apr. 3, 2015, www.bleepingcomputer.com.
Scaife, N. et al., "CrytoLock (and Drop It): Stopping Ransomware Attacks on User Data," 2016 IEEE 36.sup.th International Conference on Distributed Computing Systems, IEEE, 2016, pp. 303-312.
EasySyncSolutions, CryptoMonitor, EasySync, 2015, May be Retrieved at<URL:https://web.archive.org/web/20150406000422/http://www.easysyncsolutions.com:80/cryptomonitordetails.html>.

* cited by examiner

BEHAVIOR-BASED RANSOMWARE DETECTION

CROSS REFERENCE TO RELATED APPLICATIONS

This application is a continuation of U.S. application Ser. No. 15/414,579, filed Jan. 24, 2017, which is incorporated by reference in its entirety.

FIELD OF ART

The present disclosure generally relates to malware detection and more specifically to behavior-based ransomware detection.

BACKGROUND

Ransomware is malware that encrypts or locks computer files, and then demands payment of a "ransom" to decrypt or unlock them. There is no guarantee that paying the ransom will regain access and victims of ransomware can be subject to multiple attacks if they are not protected. Ransomware encryption can be at military grade leaving it nearly impossible to break. Furthermore, ransomware often operates to obfuscate the identity of the actual source file causing the ransomware attack. For example, ransomware attacks can use existing device processes and threads to hide. Ransomware threads can also inject themselves into other processes or ransomware threads can start processes and then inject threads into the processes. Thus ransomware is traditionally very difficult to detect, stop, and remediate.

SUMMARY

A method detects and removes malware. A thread executing on a computing device is monitored. A processor detects a behavior of the thread that conforms to one of a predefined set of behaviors indicative of ransomware. Responsive to detecting the behavior, a new indicator associated with the detected behavior is stored to a log in a storage device. The log also stores a plurality of past indicators for respective previously detected behaviors of the thread. The new indicator and the plurality of past indicators are each associated with respective scores. A running score for the thread is generated by combining the respective scores of the plurality of past indicators and the new indicator associated with the thread in the log. Responsive to determining that the running score exceeds a predefined threshold score, execution of the thread is terminated.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

An anti-malware application stops ransomware attacks and eliminates the ransomware file causing the attack. The anti-malware application uses behavior-based detection to quickly identify ransomware with a low rate of false positives.

Figure 1:
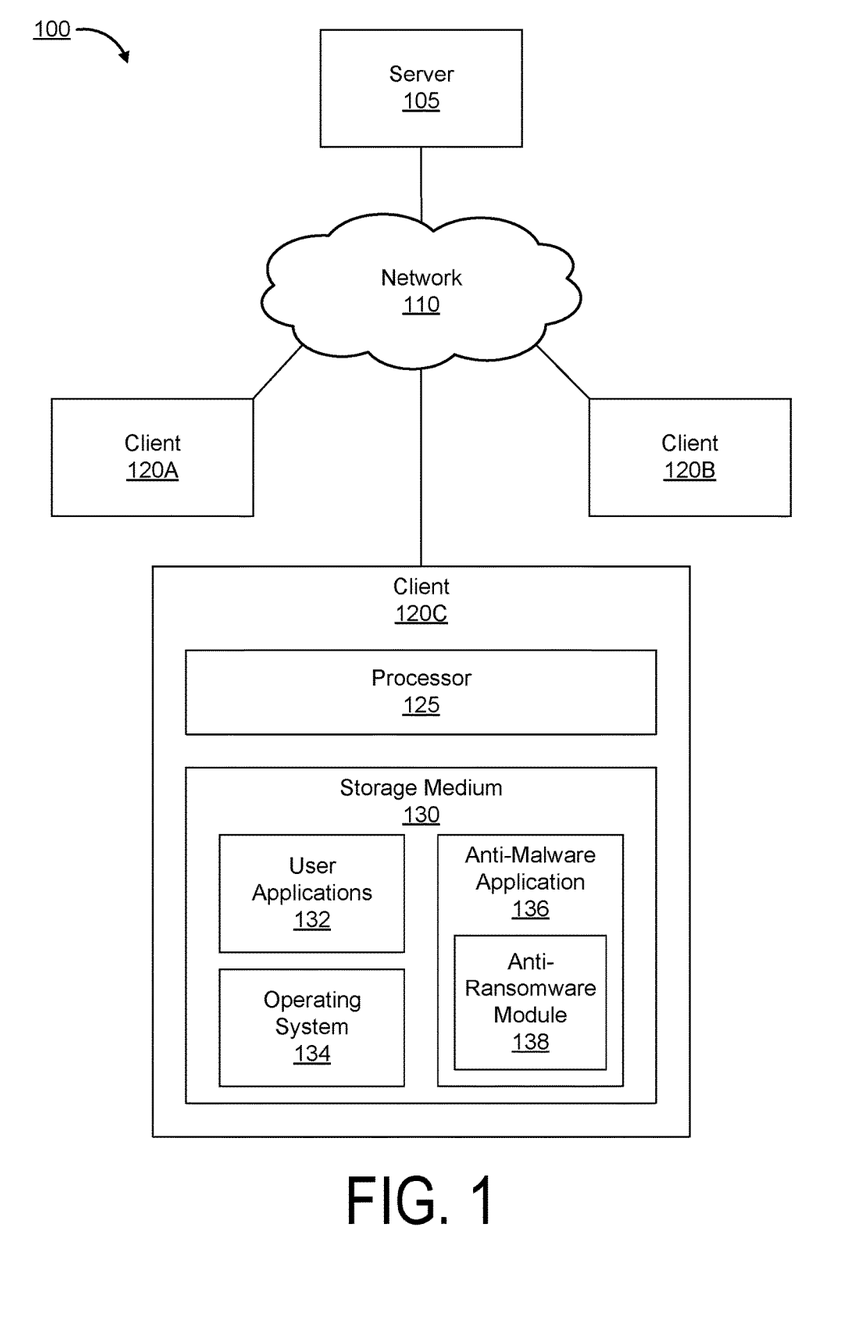
FIG. 1 is a system diagram illustrating an example embodiment of an environment in which an anti-malware application executes.

FIG. 1 is a high-level block diagram illustrating a system environment 100 for an anti-malware application. The system environment 100 comprises a server 105, a network 110, and various clients 120A, 120B, 120C (collectively referenced herein as clients 120). For simplicity and clarity, only one server 105 and a limited number of clients 120 are shown; however, other embodiments may include different numbers of servers 105 and clients 120. Furthermore, the system environment 100 may include different or additional entities.

The server 105 is a computer system configured to store, receive, and transmit data to client devices 120 via the network 110. The server 105 may include a singular computing system, such as a single computer, or a network of computing systems, such as a data center or a distributed computing system. In an embodiment, the server 105 is a content or data server providing information to a client 120. For example, the server 105 may be a website server that provides web content for viewing on clients 120. Furthermore, the server 105 may be a file server that provides files that can be downloaded by the clients 120. The server 105 may receive requests for data from clients 120 and respond by transmitting the requested data to the clients 120. The server 105 is a potential source of malware that may infiltrate one or more clients 120. For example, as a user browses websites or downloads network files, malware embedded in the website or files may become installed on a client 120, often without the user's knowledge.

The network 110 represents the communication pathways between the server 105 and clients 120. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data as well as transmitting and receiving data via a network 110. For example, a client device 120 may be a desktop computer, a laptop computer, a smart phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, discs and the like. In addition to storing program instructions, the storage medium 130 stores various data associated with operation of the operating system 134, the anti-malware application 136, and other applications 132.

In one embodiment, the storage medium 130 comprises a non-transitory computer-readable storage medium. Various executable programs (e.g., the operating system 134, anti-malware application 136, and user applications 132) are each embodied as computer-executable instructions stored to the non-transitory computer-readable storage medium. The instructions, when executed by the processor 125, cause the client 120 to perform the functions attributed to the programs described herein.

The operating system 134 is a specialized program that manages computer hardware resources of the client 120 and provides common services to the user applications 132. For example, a computer's operating system 134 may manage the processor 125, storage medium 130, or other components not illustrated such as, for example, a graphics adapter, an audio adapter, network connections, disc drives, and USB slots. A cell phone's operating system 134 may manage the processor 125, storage medium 130, display screen, key pad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the benefit of the user. Examples of user applications 132 may include a word processor, a spreadsheet application, and a web browser. In some cases, a user application 132 can be a source of malware that is unknowingly hidden in the user application 132. The malware may infect the client 120 when the user application 132 is installed.

An anti-malware application 136 detects, stops, and removes malware, which may include ransomware as well as other types of malware. The anti-malware application 136 may prevent new malware from being installed on a client 120 or remove or disable existing malware that is already present on the client 120. The anti-malware application 136 may furthermore access a central server via the network 110 in order to download new malware definition files that specify characteristics or behaviors of known malware that the anti-malware application 136 seeks to detect. The anti-malware application includes an anti-ransomware module 138 that is specifically configured to detect, halt, and remove ransomware. The anti-ransomware module 138 is described in further detail below.

Figure 2:
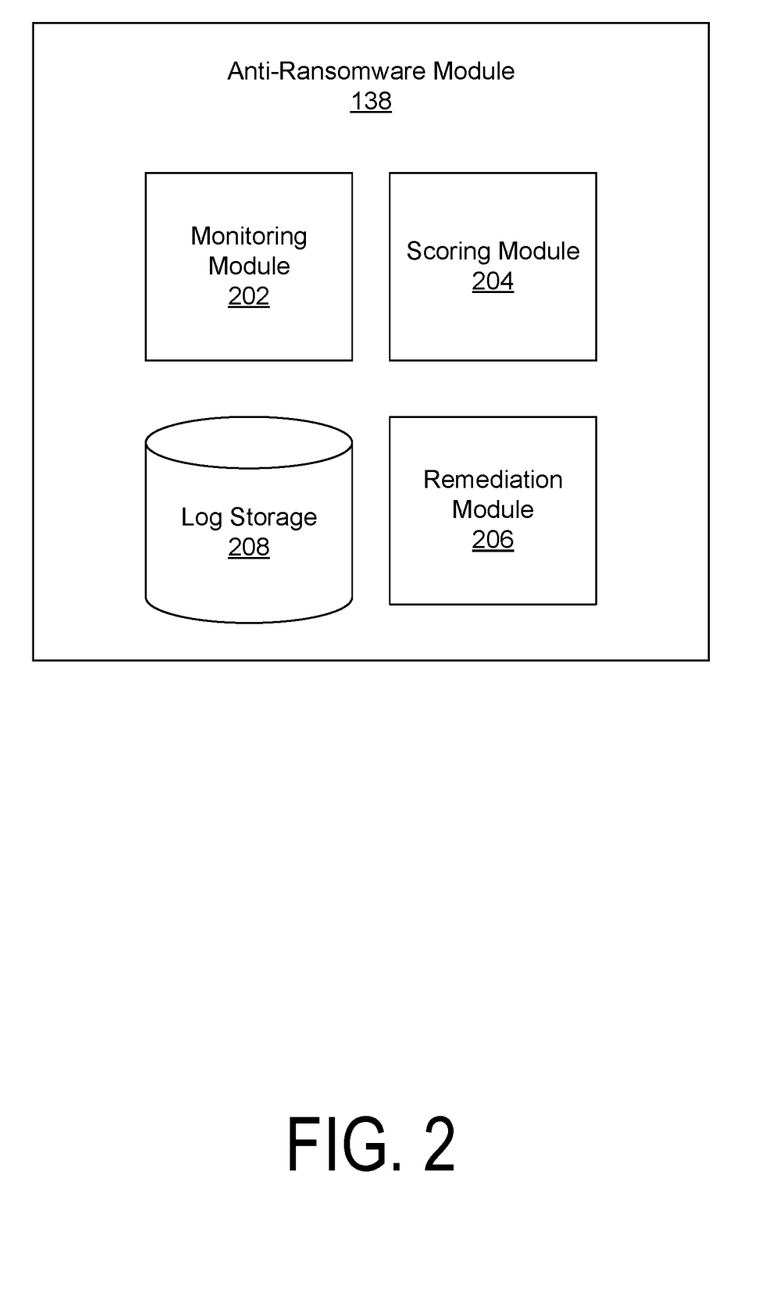
FIG. 2 is a block diagram illustrating an example embodiment of an anti-ransomware module of the anti-malware application.

FIG. 2 illustrates an example embodiment of an anti-ransomware module 138. The anti-ransomware module includes a monitoring module 202, a scoring module 204, a remediation module 206, and a log storage 208. Alternative embodiments may include different or additional modules or omit one or more of the illustrated modules.

The monitoring module 202 monitors executing processes and threads and stores metadata associated with each executing process and thread to the log storage 208. A process is an instance of a computer program (e.g., a user application 132) that is being executed. A process may include one or more threads each comprising a sequence of instructions executing in an address space of the process. The execution of a process or thread may create additional processes or threads. Creating an additional process or thread may include causing the new process or thread to launch, injecting new instructions into an already executing process or thread, or modifying instructions in an existing process or thread.

The log storage 208 may store a process tree and a thread tree to respectively track the processes and threads being executed. Each node in the process tree and thread tree may also store behavior data associated with the process or thread as will be described in further detail below.

In the process tree, each node corresponds to a different process and the branches represent relationships between the processes. A root node in the process tree corresponds to a root process that is the first process launched upon execution of an executable file. Other than the root node, each process node in the process tree is connected to a parent process node corresponding to a parent process from which the process was created. A given process node in the process tree may also be connected to one or more child process nodes corresponding to one or more child processes created by the process.

Similarly, in the thread tree, each thread node corresponds to a different executing thread. Each thread node in the thread tree (with the exception of a root thread that is the first thread executed when an executable file is launched) is connected to a parent thread node corresponding to a parent thread from which the thread was created. Furthermore, a given thread node in the thread tree may be connected to one or more child thread nodes corresponding to child threads created by the thread.

Each node in the process tree may also have cross-connections to nodes in the thread tree and vice versa. For example, each process node may have cross-connections to each thread running in the process and each thread node may have a cross-connection to the process in which it executes.

The process tree and thread tree may each have multiple layers. Thus, a given node in a tree may have multiple levels of descendent nodes and may have multiple levels of ancestor nodes. For example, a given node may have one or more child nodes, one or more grandchild nodes (child nodes of the child nodes), one or more great grandchild nodes (child nodes of the grandchild nodes), etc. Furthermore, a given node may have a parent node, a grandparent node (s parent node of the parent node), a great grandparent node (a parent node of the grandparent node), etc.

In one embodiment, the process tree and the thread tree may be logically stored as a table in which each entry in the table corresponds to an identifier for a particular process or thread and the connections for each entry are stored as references to the respective identifiers of the connected nodes. For example, a memory address associated with the process or thread may be used as an identifier.

The process tree and thread tree provide a representation of the various event chains (e.g., injection chains) that may give rise to the execution of any given process or thread. As will be explained in further detail below, these structures are useful during remediation to identify the processes or threads that gave rise to an identified malicious thread, and to trace the chain back to a source file.

The monitoring module 202 monitors the executing processes and threads for certain behaviors (e.g., from a predefined list of behaviors) that may be indicative of ransomware or otherwise relevant to distinguishing between ransomware and goodware. Upon detection of a particular behavior, the monitoring module 202 stores an indicator (e.g. from a predefined list of indicators each corresponding to a respective behavior) to the log storage 208 that uniquely identifies the detected behavior together with a timestamp indicating the time of detection. This indicator is stored in association with the node representing the process or thread in which the behavior was observed.

Each of the indicators is associated with a predefined score that may vary between different indicators. The different scores for different indicators may correspond to how strongly the behavior associated with that indicator is correlated to the presence of ransomware. For example, behaviors that are very commonly observed when ransomware is present and rarely observed when only goodware is present may correspond to strong indicators with relatively high scores. In contrast, behaviors that are commonly associated with goodware or are only occasionally associated with ransomware may correspond to weak indicators with relatively low scores.

The various indicators may each be associated with either process-level behaviors, thread-level behaviors, or a combination thereof. At the process level, the monitoring module 202 may store different process-level indicators to the log storage 208 to represent launch of a new process or termination of the process. The monitoring module 202 may furthermore store process-level indicators to the log storage 208 when the process passes certain command lines arguments indicative of ransomware upon launch. Different indicators may be used to represent different ones of these command line arguments. Examples of command line arguments that may be representative of ransomware behavior may include a command line argument to disable a default recovery action in case of an error, a command line argument that causes execution of an encryption operation, and a command line argument for generating an encryption key. A separate process-level indicator may also be stored if the process is launched from an executable file that is less than a predefined age.

At the thread level, different thread-level indicators may be stored to the log storage 208 whenever a new thread launches or terminates. Furthermore, during execution of the thread, different thread-level indicators may be stored to represent different file operations performed by the thread. Examples of standard file operations performed by the thread may include creation of a new file, deletion of a file, reading of an existing file, writing to a file, renaming a file, closing a file, and scanning a folder to access the files or folders within it. These standard file operations may be weak indicators of ransomware because although these actions are commonly performed by ransomware, they are also commonly performed by goodware. Thus, these standard file operation indicators may have relatively low scores associated with them.

Other types of file operations are more suspicious and may serve as strong indicators of ransomware with relatively high scores. Examples of particularly suspicious file operations performed by a thread may include modifying a file such that the file's contents do not match the file's extension, encrypting a file, transforming a file to a folder or vice versa, creating a new alias for a file, obtaining a reference to another process with request for suspicious permissions, obtaining a reference to another thread with a request for suspicious permissions, deleting an operating system artifact used to recover from recent system changes, accessing a location where the operating system stores user encryption keys, and accessing a location where the operating system stores internal encryption keys.

The monitoring module may furthermore store different thread-level indicators to the log storage 208 to represent detection of the thread's usage of an encryption sub-system of the operating system 134. These behaviors also typically serve as strong indicators of ransomware because ransomware commonly utilize these sub-system components to encrypt files. Examples of these behaviors performed by a thread may include modifying a value under any of the cryptographic related registry locations, creating a new key in the cryptographic related registry locations, opening an existing key in the cryptographic related registry locations, and using an encryption algorithm.

The monitoring module 202 may furthermore store different thread-level indicators to the log storage 208 to represent detection of injection behaviors associated with the thread. These injection behaviors may serve as moderate indicators of ransomware because they are very commonly performed by ransomware in an effort to hide the source, but are also sometimes performed by goodware. Examples of injection behaviors performed by a thread may include injecting a new thread into another process, launching of the thread via injection by another thread, injecting code into another existing thread on another process, execution of code that was injected into the thread from a process external to the thread, and modifying the executable code of another thread.

In some embodiments, the monitoring module 202 may log an additional pattern-based indicator to the log storage 208 when it detects a particular combination of behaviors that conforms to a predefined pattern in a list of predefined patterns. These pattern-based indicators represent particularly strong indicators of ransomware and may have particularly high scores. As one example, a pattern-based indicator may be stored when a file that is not created or deleted by the thread is read and written to by the thread such that it is transformed from an unencrypted file to an encrypted file and transformed to contain content that does not follow the expected format according to its file extension. In another example, a different pattern-based indicator may be stored when a thread reads and deletes an unencrypted file and creates a new encrypted file. In yet another example, a different pattern-based indicator may be stored when a thread creates a new file in the same folder as each existing file that it reads and then deletes. These behavior patterns are strongly associated with ransomware behavior and provide a strong indication that ransomware is present.

Indicators in the log storage 208 may automatically expire and be removed from the log storage 208 when the associated thread or process ends. Furthermore, each indicator may expire and be removed from the log storage 208 after a predefined time period from when the indicator was added (e.g., represented by a timestamp) even if the thread continues to execute. The time period before an indicator expires may be set to be long enough to cover the time it takes for a typical sequences of ransomware behaviors to execute, and may be set short enough to avoid false positives based on actions unrelated to ransomware that occur over a long period of time. In an embodiment, different indicators may expire after different predefined time periods. In this embodiment, the scores for different indicators may stay in the log storage 208 for different amounts of time. In another embodiment, a uniform predefined time period is used such that all indicators expire after the same predefined time period from when they are detected.

For each executing thread, the scoring module 204 generates a respective running score for the thread based on the combined scores of active indicators (e.g., within the predefined time period) associated with that thread in the log storage 208. In one embodiment, the scoring module 204 may compute the score for a given thread as a combination of both thread-level indicators for the thread and process-level indicators for the process in which the thread runs. Furthermore, in one embodiment, the scoring module 204 may generate the score for a thread based in part on scores associated with descendent threads (e.g., child threads that were launched by the thread, grandchild threads that were launched by the child threads, and so on). The scores for the descendent threads may be weighted less heavily in the combined score for a thread by scaling them by various factors (e.g., scores for child threads are scaled by a first scaling factor, scores grandchild threads are scaled by a second scaling factor, etc.).

The scoring module 204 triggers a ransomware detection when the combined score for a thread exceeds a predefined threshold. The scores associated with each indicator, the detection threshold, and the time period until an indicator expires may each be tailored to enable reliable and quick detection of ransomware with a low rate of false positives. For example, the scoring system may be applied to a test client 120 with known instances of ransomware executing, and an optimization algorithm may be used to optimize the scores for each indicator, the detection threshold, and the expiration time period to achieve desired tradeoff between performance parameters (e.g., speed of detection, false positive rate, false negative rate, etc.). This optimization may be performed periodically by an administrator as new ransomware becomes known. New definition files specifying the indicator list, scoring system, or other parameters may then be periodically provided to the clients 120.

The remediation module 206 operates to remediate the ransomware when a detection is triggered. Remediation may include terminating the thread that triggered the detection and any related processes or threads, tracing the malicious thread back to a source file, and quarantining the source file. Quarantining the file isolates the source so that it is no longer capable of affecting operation of the client 120. Quarantining may include deleting the source file or moving it to a special area of memory. In order to locate the source file, the remediation module 206 may identify threads and processes relating to the malicious thread using the references to related parent or child threads stored in the process tree and thread tree of the log storage 208, and traverse the trees back to a root process originating from a source file.

In an embodiment, to reduce the likelihood of false positives, the remediation module 206 may employ a set of safeguards to avoid quarantining a goodware file. For example, if the malicious activity is traced back to a system protected file, a file that is signed with a trusted certificate, or a file on a whitelist of known goodware, the detection is ignored and no remediation action is taken.

Figure 3:
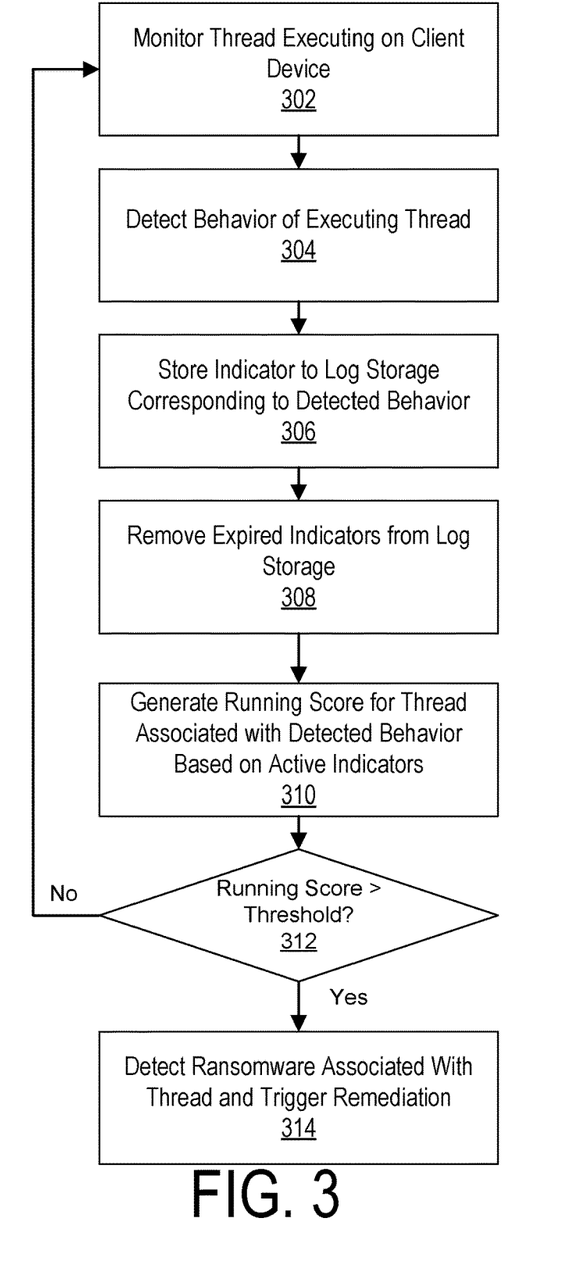
FIG. 3 is a flowchart illustrating an embodiment of a process for detecting a ransomware attack using behavior-based detection.

FIG. 3 is a flowchart illustrating an embodiment of a process for detecting and remediating ransomware on a client device. The monitoring module 202 monitors 302 a thread executing on the client device. The monitoring module 202 detects 304 a behavior conforming to a predefined list of monitored behaviors that are indicative of ransomware or are useful in distinguishing between ransomware and goodware. The monitoring module 202 stores 306 an indicator to the log storage 208 representing the detected behavior. Expired indicators (e.g., indicators that are older than the predefined time period since detection) are removed 308 from the log storage 208. The scoring module 204 generates 310 a running score for the thread associated with the detected behavior by combining scores for active indicators associated with the thread in the storage log 208. The scores associated with the thread may also include scores for active indicators associated with the process in which the thread runs or active indicators associated with parent or child threads. The running score is compared 312 against a predefined threshold. If the running score does not exceed the predefined threshold, no detection is triggered and the monitoring module 202 continues to monitor 302 processes and threads. If the running score exceeds the threshold, ransomware associated with the thread is detected and the scoring module 204 triggers 314 the remediation module 206 to begin remediation.

Figure 4:
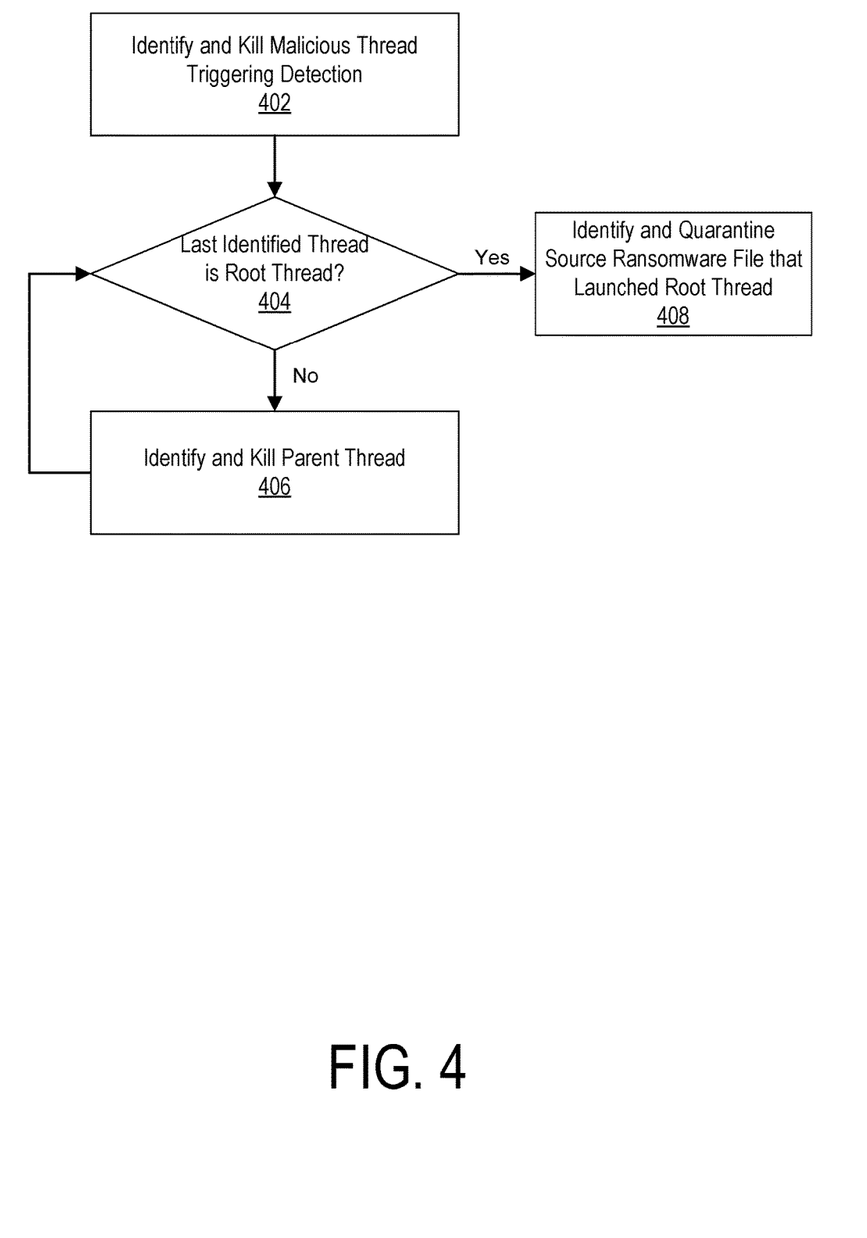
FIG. 4 is a flowchart illustrating an example embodiment of a process for identifying and eliminating a source ransomware file following detection of a ransomware attack.

FIG. 4 is a flowchart illustrating an embodiment of a process for performing remediation after detection of a ransomware attack. The remediation module 206 identifies 402 and kills the malicious thread that triggered the detection and the process in which it runs. The remediation module 206 determines 404 if the last killed thread is a root thread (with no reference to a parent thread). If the last killed thread is a root thread (does not have another parent thread), the remediation module 206 identifies and quarantines the source ransomware file that launched the process in which the thread runs. If the last identified thread is not a root thread (a reference to another parent thread exists), the remediation module 206 identifies and kills 406 a parent thread associated with the malicious thread that triggered the detection and the process in which it runs. Identifying the parent thread may involve reading the thread tree structure in the log storage 208 to determine which parent threads are connected to the malicious thread.

The above-described system and processes beneficially enables reliable detection and remediation of ransomware. By relying on detection of behaviors indicative of ransomware together with the above-described scoring system, the anti-malware application 136 can detect many different instances of ransomware including ones without specifically known source files. Furthermore, by utilizing the thread and process trees to track relationships between executing threads and processes, the anti-malware application 136 can detect the source ransomware file even when the ransomware tries to obfuscate its source by utilizing various complex injection chains.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for detecting and terminating malware, the method comprising:
   storing to a log in a storage device, a plurality of thread-level indicators associated with detected behavior of a target thread and respective thread-level scores associated with the thread-level indicators;
   storing to a log in a storage device, a plurality of process-level indicators associated with detected behavior of a process in which the target thread is executing, and respective process-level scores associated with the process-level indicators;
   monitoring the target thread executing on a computing device;
   detecting, by a processor, a behavior of the target thread that conforms to one of a predefined set of behaviors indicative of ransomware;
   responsive to detecting the behavior, updating the plurality of thread-level indicators to include a new thread-level indicator associated with the detected behavior of the target thread and updating the respective thread-level scores to include a new thread-level score associated with the new thread-level indicator;
   generating a running score for the target thread by combining the process-level scores and the thread-level scores from the log;
   determining that the running score for the target thread exceeds a predefined threshold score; and
   responsive to determining that the running score exceeds the predefined threshold score, terminating execution of the target thread.

2. The method of claim 1, further comprising:
   identifying a source malware file that initiated launching of the target thread; and
   quarantining the source malware file.

3. The method of claim 1, wherein generating the running score comprises:
   identifying, based on a reference stored in the log, a child thread created by the target thread;
   identifying a child score for the child thread; and
   combining the child score with the thread-level scores and the process-level scores.

4. The method of claim 1, wherein detecting the behavior of the target thread comprises:
   detecting that a file which is not created by and is not deleted by the target thread is read by the target thread and written to by the target thread;
   detecting that the target thread transforms the file from an unencrypted file to an encrypted file;
   detecting that the target thread transforms content of the file such that it fails to conform an expected format associated with a file extension of the file.

5. The method of claim 1, wherein detecting the behavior of the target thread comprises:
   detecting that the target thread reads an unencrypted file;
   detecting that the target thread deletes the unencrypted file; and
   detecting that the target thread creates a new encrypted file.

6. The method of claim 1, wherein detecting the behavior of the target thread comprises:
   detecting that the target thread reads a target file;

detecting that the target thread deletes the target file; and detecting that the target thread creates a new file in a same folder as the target file.

7. The method of claim 1, further comprising:

detecting that a time period since detection of the new thread-level indicator exceeds a time threshold; and removing the new thread-level indicator from the log responsive to the time period since the detection of the new thread-level indicator exceeding the time threshold.

8. A non-transitory computer-readable storage medium storing instructions for detecting and terminating malware, the instructions when executed by a processor cause the processor to perform steps including:

storing to a log in a storage device, a plurality of thread-level indicators associated with detected behavior of a target thread and respective thread-level scores associated with the thread-level indicators;

storing to a log in a storage device, a plurality of process-level indicators associated with detected behavior of a process in which the target thread is executing, and respective process-level scores associated with the process-level indicators;

monitoring the target thread executing on a computing device;

detecting a behavior of the target thread that conforms to one of a predefined set of behaviors indicative of ransomware;

responsive to detecting the behavior, updating the plurality of thread-level indicators to include a new thread-level indicator associated with the detected behavior of the target thread and updating the respective thread-level scores to include a new thread-level score associated with the new thread-level indicator;

generating a running score for the target thread by combining the process-level scores and the thread-level scores from the log;

determining that the running score for the target thread exceeds a predefined threshold score; and responsive to determining that the running score exceeds the predefined threshold score, terminating execution of the target thread.

9. The non-transitory computer-readable storage medium of claim 8, wherein the instructions when executed further cause the processor to perform steps including:

identifying a source malware file that initiated launching of the target thread; and quarantining the source malware file.

10. The non-transitory computer-readable storage medium of claim 8, wherein generating the running score comprises:

identifying, based on a reference stored in the log, a child thread created by the target thread;

identifying a child score for the child thread; and combining the child score with the thread-level scores and the process-level scores.

11. The non-transitory computer-readable storage medium of claim 8, wherein detecting the behavior of the target thread comprises:

detecting that a file which is not created by and is not deleted by the target thread is read by the target thread and written to by the target thread;

detecting that the target thread transforms the file from an unencrypted file to an encrypted file;

detecting that the target thread transforms content of the file such that it fails to conform an expected format associated with a file extension of the file.

12. The non-transitory computer-readable storage medium of claim 8, wherein detecting the behavior of the target thread comprises:

detecting that the target thread reads an unencrypted file;

detecting that the target thread deletes the unencrypted file; and detecting that the target thread creates a new encrypted file.

13. The non-transitory computer-readable storage medium of claim 8, wherein detecting the behavior of the target thread comprises:

detecting that the target thread reads a target file;

detecting that the target thread deletes the target file; and detecting that the target thread creates a new file in a same folder as the target file.

14. The non-transitory computer-readable storage medium of claim 8, further comprising:

detecting that a time period since detection of the new thread-level indicator exceeds a time threshold; and removing the new thread-level indicator from the log responsive to the time period since the detection of the new thread-level indicator exceeding the time threshold.

15. A computing system comprising:

a processor; and a non-transitory computer-readable storage medium storing instructions for detecting and terminating malware, the instructions when executed by the processor cause the processor to perform steps including:

storing to a log in a storage device, a plurality of thread-level indicators associated with detected behavior of a target thread and respective thread-level scores associated with the thread-level indicators;

storing to a log in a storage device, a plurality of process-level indicators associated with detected behavior of a process in which the target thread is executing, and respective process-level scores associated with the process-level indicators;

monitoring the target thread executing on a computing device;

detecting a behavior of the target thread that conforms to one of a predefined set of behaviors indicative of ransomware;

responsive to detecting the behavior, updating the plurality of thread-level indicators to include a new thread-level indicator associated with the detected behavior of the target thread and updating the respective thread-level scores to include a new thread-level score associated with the new thread-level indicator;

generating a running score for the target thread by combining the process-level scores and the thread-level scores from the log;

determining that the running score for the target thread exceeds a predefined threshold score; and responsive to determining that the running score exceeds the predefined threshold score, terminating execution of the target thread.

16. The computing system of claim 15, wherein detecting the behavior of the target thread comprises:

detecting that a file which is not created by and is not deleted by the target thread is read by the target thread and written to by the target thread;

detecting that the target thread transforms the file from an unencrypted file to an encrypted file;

detecting that the target thread transforms content of the file such that it fails to conform an expected format associated with a file extension of the file.

17. The computing system of claim 15, wherein detecting the behavior of the target thread comprises:
   detecting that the target thread reads an unencrypted file;
   detecting that the target thread deletes the unencrypted file; and
   detecting that the target thread creates a new encrypted file.

18. The computing system of claim 15, further comprising:
   detecting that a time period since detection of the new thread-level indicator exceeds a time threshold; and
   removing the new thread-level indicator from the log responsive to the time period since the detection of the new thread-level indicator exceeding the time threshold.

* * * * *